United States Patent
Abbott, Jr. et al.

(10) Patent No.: US 11,020,874 B2
(45) Date of Patent: Jun. 1, 2021

(54) THREE-DIMENSIONAL (3D) PRINTING WITH A SINTERING AID/FIXER FLUID AND A LIQUID FUNCTIONAL MATERIAL

(71) Applicant: Hewlett-Packard Development Company, L.P., Houston, TX (US)

(72) Inventors: James Elmer Abbott, Jr., Corvallis, OR (US); Vladek Kasperchik, Corvallis, OR (US); Joshua Flynn, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 404 days.

(21) Appl. No.: 15/771,134

(22) PCT Filed: Feb. 25, 2016

(86) PCT No.: PCT/US2016/019611
§ 371 (c)(1),
(2) Date: Apr. 27, 2018

(87) PCT Pub. No.: WO2017/146711
PCT Pub. Date: Aug. 31, 2017

(65) Prior Publication Data
US 2019/0054651 A1    Feb. 21, 2019

(51) Int. Cl.
*B33Y 70/00*    (2020.01)
*B33Y 30/00*    (2015.01)
(Continued)

(52) U.S. Cl.
CPC .............. *B28B 1/001* (2013.01); *B28B 7/465* (2013.01); *B29C 64/165* (2017.08); *B29C 67/00* (2013.01);
(Continued)

(58) Field of Classification Search
None
See application file for complete search history.

(56) References Cited

U.S. PATENT DOCUMENTS

| | | | |
|---|---|---|---|
| 6,348,679 B1 | 2/2002 | Ryan et al. | |
| 7,708,929 B2 * | 5/2010 | Monsheimer | B29C 64/153 |
| | | | 264/460 |

(Continued)

FOREIGN PATENT DOCUMENTS

| | | |
|---|---|---|
| CN | 100564007 | 12/2009 |
| CN | 103702958 | 4/2014 |

(Continued)

OTHER PUBLICATIONS

Tarì, G., et al. "Influence of Particle Size Distribution on Colloidal Processing of Alumina." Journal of the European Ceramic Society, vol. 18, No. 3, 1998, pp. 249-253., doi: 10.1016/s0955-2219(97)00113-1. (Year: 1998).*

(Continued)

*Primary Examiner* — Alison L Hindenlang
*Assistant Examiner* — Andrés E. Behrens, Jr.
(74) *Attorney, Agent, or Firm* — Dierker & Kavanaugh PC (57) ABSTRACT

In an example of a three-dimensional (3D) printing method, a ceramic build material is applied. A liquid functional material, including an anionically stabilized susceptor material, is applied to at least a portion of the ceramic build material. A sintering aid/fixer fluid, including a cationically stabilized amphoteric alumina particulate material, is applied to the at least the portion of the ceramic build material. The applied anionically stabilized susceptor material and the applied cationically stabilized amphoteric alumina particulate material react to immobilize the anionically (Continued)

stabilized susceptor material, thereby patterning the at least the portion of the ceramic build material.

14 Claims, 4 Drawing Sheets

(51) Int. Cl.

| | |
|---|---|
| *B33Y 10/00* | (2015.01) |
| *B33Y 50/02* | (2015.01) |
| *B32B 18/00* | (2006.01) |
| *B29C 67/00* | (2017.01) |
| *C04B 35/64* | (2006.01) |
| *C04B 35/634* | (2006.01) |
| *B28B 1/00* | (2006.01) |
| *B28B 7/46* | (2006.01) |
| *C04B 35/111* | (2006.01) |
| *C04B 35/626* | (2006.01) |
| *B29C 64/165* | (2017.01) |
| *C04B 35/632* | (2006.01) |
| *B33Y 50/00* | (2015.01) |
| *B29C 65/14* | (2006.01) |

(52) U.S. Cl.
CPC ............ *B32B 18/00* (2013.01); *B33Y 10/00* (2014.12); *B33Y 30/00* (2014.12); *B33Y 50/02* (2014.12); *B33Y 70/00* (2014.12); *C04B 35/111* (2013.01); *C04B 35/6264* (2013.01); *C04B 35/632* (2013.01); *C04B 35/634* (2013.01); *C04B 35/64* (2013.01); *C04B 2235/3217* (2013.01); *C04B 2235/3218* (2013.01); *C04B 2235/3262* (2013.01); *C04B 2235/3274* (2013.01); *C04B 2235/3275* (2013.01); *C04B 2235/3418* (2013.01); *C04B 2235/424* (2013.01); *C04B 2235/5436* (2013.01); *C04B 2235/5445* (2013.01); *C04B 2235/5454* (2013.01); *C04B 2235/6026* (2013.01); *C04B 2235/667* (2013.01); *C04B 2235/9661* (2013.01); *C04B 2237/34* (2013.01); *C04B 2237/341* (2013.01); *C04B 2237/343* (2013.01); *C04B 2237/363* (2013.01)

(56) References Cited

U.S. PATENT DOCUMENTS

| | | | |
|---|---|---|---|
| 7,795,349 | B2 | 9/2010 | Bredt et al. |
| 9,114,567 | B2 | 8/2015 | Monsheimer et al. |
| 9,133,344 | B2 | 9/2015 | Ganapathiappan et al. |
| 9,777,174 | B2* | 10/2017 | Cordwell ............ C09D 11/326 |
| 2004/0094058 | A1 | 5/2004 | Kasperchik et al. |
| 2004/0232583 | A1 | 11/2004 | Monsheimer et al. |
| 2006/0045787 | A1 | 3/2006 | Jandeska, Jr. et al. |
| 2006/0208388 | A1* | 9/2006 | Bredt .................... B29C 64/165 264/123 |
| 2007/0241482 | A1 | 10/2007 | Giller et al. |
| 2014/0212677 | A1 | 7/2014 | Gnuchtel et al. |
| 2015/0266238 | A1 | 9/2015 | Ederer et al. |
| 2018/0265417 | A1* | 9/2018 | Champion .............. C04B 35/46 |

FOREIGN PATENT DOCUMENTS

| | | | | |
|---|---|---|---|---|
| CN | 104529478 | | 4/2015 | |
| CN | 104610511 | | 5/2015 | |
| EP | 1524049 | | 8/2009 | |
| WO | WO2003063548 | * | 7/2001 | ............ H05B 6/106 |
| WO | WO-2005023524 | | 3/2005 | |
| WO | WO-2014/134224 | | 9/2014 | |
| WO | WO-2015/023612 | | 2/2015 | |
| WO | WO-2016053305 A1 | | 4/2016 | |

OTHER PUBLICATIONS

"Capillary Action." Wikipedia, the Free Encyclopedia, Jan. 26, 2016, web.archive.org/web/20160126070706/en.wikipedia.org/wiki/Capillary_action. (Year: 2016).*

"Water Treatment Solutions." Aluminum (Al) and Water, Jan. 6, 2016, web.archive.org/web/20160106075830/www.lenntech.com/periodic/water/aluminium/aluminum-and-water.htm. (Year: 2016).*

"Aluminium Hydroxide." Wikipedia, Wikimedia Foundation, Jan. 30, 2016, web.archive.org/web/20160130144852/en.wikipedia.org/wiki/Aluminium_hydroxide. (Year: 2016).*

"Surfactant." Surfactant—Wikipedia, the Free Encyclopedia, Jan. 18, 2016, web.archive.org/web/20160118103451/en.wikipedia.org/wiki/Surfactant. (Year: 2016).*

"Aluminium Oxide." Wikipedia, Wikimedia Foundation, Feb. 21, 2016, web.archive.org/web/20160221150527/en.wikipedia.org/wiki/Aluminium_oxide. (Year: 2016).*

Chang, S.H., Ryan, M.H. & Gupta, R.K. The effect of pH, ionic strength, and temperature on the rheology and stability of aqueous clay suspensions. Rheola Acta 32, 263-269 (1993). https://doi.org/10.1007/BF00434190 (Year: 1993).*

Cushman , Chris. "Is PH the Measurement of Hydrogen Ion Concentration or Ion Activity?" YSI, Jan. 30, 2015, www.ysi.com/ysi-blog/water-blogged-blog/2015/01/is-ph-the-measurement-of-hydrogen-ion-concentration-or-ion-activity. (Year: 2015).*

Funk, James E., and Dennis R. Dinger. "Predictive Process Control of Crowded Particulate Suspensions." 1994, doi: 10.1007/978-1-4615-3118-0. (Year: 1994).*

"Dispersant." Wikipedia, Wikimedia Foundation, Sep. 29, 2015, web.archive.org/web/20150929032258/en.wikipedia.org/wiki/Dispersant. (Year: 2015).*

Sáenz-Galindo, Aidé, et al. "Applications of Carboxylic Acids in Organic Synthesis, Nanotechnology and Polymers." Carboxylic Acid—Key Role in Life Sciences, 2018, doi:10.5772/intechopen.74654. (Year: 2018).*

"Neutralization (Chemistry)." Wikipedia, Wikimedia Foundation, Jan. 21, 2016, web.archive.org/web/20160121133817/en.wikipedia.org/wiki/Neutralization_(chemistry). (Year: 2016).*

Development Process for Custom Three-Dimensional Printing (3DP) Material Systems.

* cited by examiner

THREE-DIMENSIONAL (3D) PRINTING WITH A SINTERING AID/FIXER FLUID AND A LIQUID FUNCTIONAL MATERIAL

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In some examples of three-dimensional (3D) printing, an entire layer of a build material (also referred to as build material particles) is exposed to radiation, but a selected region (in some instances less than the entire layer) of the build material is sintered or fused and hardened to become a layer of a 3D part. When microwave energy is used for sintering or fusing, this process has been referred to as Microwave Area Processing. In some examples, a liquid functional material is selectively deposited in contact with the selected region of the build material, thereby patterning the selected region. The liquid functional material is capable of penetrating into the layer of the build material and spreading onto the exterior surface of the build material. Some liquid functional materials are also capable of absorbing radiation and converting the absorbed radiation to thermal energy, which in turn melts or sinters the build material that is in contact with the liquid functional material. Melting or sintering causes the build material to fuse, bind, cure, etc. to form the layer of the 3D part. Other examples of the liquid functional material may be fusing aids, which lower the temperature at which fusing, binding, curing, etc. of the build material takes place. Still other liquid functional materials may be used to modify the build material properties, e.g., electrical properties, magnetic properties, thermal conductivity, etc.

During other examples of 3D printing, a liquid functional material is selectively applied to a layer of build material, and then another layer of the build material is applied thereon. The liquid functional material may be applied to this other layer of build material, and these processes may be repeated to form a green body of the 3D part that is ultimately to be formed. The green body may then be exposed to radiation and heating to melt or sinter, densify, fuse, and harden the green body to form the 3D part. When microwave energy is used for sintering or fusing of the whole volume of the treated green body, this process has been referred to as Microwave Volume Processing.

In some instances, to render the selected region of build material highly absorptive of the applied radiation, relatively large quantities of the liquid functional material may be applied. Voids between the build material can form a network of capillary channels within the build material layer(s), and capillary forces arising from wetting the selected region of the build material with the liquid functional material may lead to uncontrolled wicking, propagation or diffusion of the liquid functional material into surrounding build material (i.e., outside the selected region). This may result in the subsequent solidification of area(s)/portion(s) of the build material that were not intended to be solidified. This may result, for example, in a reduction in the overall dimensional accuracy of generated 3D objects (i.e., parts). For example, edge acuity may be undesirably rough and/or undefined, the resolution of original fine features may be compromised or completely lost, etc.

The effects of liquid functional material propagation or diffusion during formation of the 3D object may be managed by delivering an example of the liquid functional material disclosed herein to portion(s) of the build material and by delivering an example of sintering aid/fixer fluid on the same portion(s). The sintering aid/fixer fluid includes a cationically stabilized amphoteric alumina particulate material and the liquid functional material includes an anionically stabilized susceptor material. When the two fluids come in contact with each other, the cationically stabilized amphoteric alumina particulate material and the anionically stabilized susceptor material co-precipitate (or co-crash out of their respective fluids) and flocculate together. The precipitation/crashing restricts the motion of the anionically stabilized susceptor material, and thus prevents further propagation or diffusion (by capillary wicking) of the anionically stabilized susceptor material throughout the build material. As such, the sintering aid/fixer fluid keeps active solid ingredients (i.e., the anionically stabilized susceptor material) from moving into surrounding portion(s) of the build material that are not to be sintered/fused. Since the sintering aid/fixer fluid prevents undesirable spreading of the material responsible for aiding in microwave or radio frequency (RF) radiation absorption (when this type of radiation is used) and sintering/fusing, the sintering aid/fixer fluid can contribute to overall dimensional accuracy and edge acuity.

Moreover, the precipitation/crashing also restricts the motion of the cationically stabilized amphoteric alumina particulate material. The immobilized cationically stabilized amphoteric alumina particulate material occupies at least some of the voids between the larger build material particles, due in part to the particle size of the cationically stabilized amphoteric alumina particulate material being in the nano range (i.e., 100 nm or less). The term "size" or "particle size," as used herein, refers to the diameter of a substantially spherical particle or particulate material, or the average diameter of a non-spherical particle or particulate material (i.e., the average of multiple diameters across the particle), or the effective diameter of a non-spherical particle or particulate material (i.e., the diameter of a sphere with the same mass and density as the non-spherical particle). A substantially spherical particle (i.e., spherical or near-spherical) has a sphericity of >0.84. Thus, any individual particles having a sphericity of <0.84 are considered non-spherical (irregularly shaped).

As mentioned above, the size and restricted mobility of the cationically stabilized amphoteric alumina particulate material allows the particulate material to occupy at least some of the voids between the larger build material particles (which generally have a particle size greater than or equal to 10 μm). Filling at least some of the voids in the build material layer(s) with smaller particulate material (that is capable of being sintered with the build material) improves the sintering efficiency, in part because sintering is a diffusion based process and sintering speed is dependent on the particle size. For the majority of ceramic materials, the sintering rate is inversely proportional to the material particle diameter in a power ranging from 2 to 4. Thus, decreasing the particle diameter of at least some of the particles that are sintered accelerates the sintering rate. These small particulate materials may act as a reactive glue binding together/forming bridges between surfaces of much larger (slower sintering) particles of build material. Filling at least some of the voids in the build material layer(s) with smaller particulate material (that is capable of being sintered with the build material) also improves the densification and structural properties (at a voxel level) of the 3D object that is formed. Still further, by maintaining the larger size of the build material particles, the build material particles can be easily spread in thin layers (smaller particles tend to form irregularly-shaped clumps due to strong Van Der Waals attraction between the particles). The ability of the build material to be spread into thin layers with well controlled uniformity can affect the precision and quality of the 3D part that is formed.

Figure 1A:
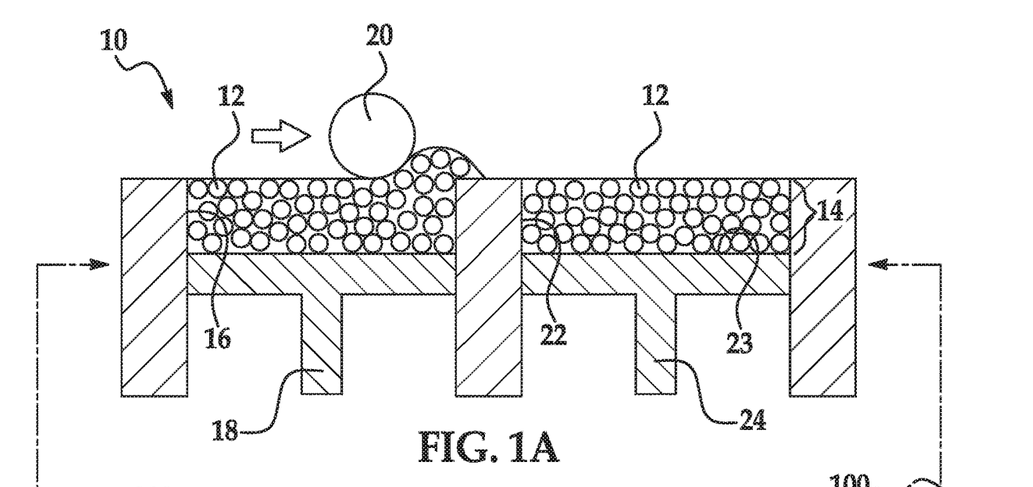
FIGS. 1A through 1C are schematic cross-sectional views depicting the formation of layer(s) of a 3D object using examples of a 3D printing method disclosed herein.
Figure 1B:
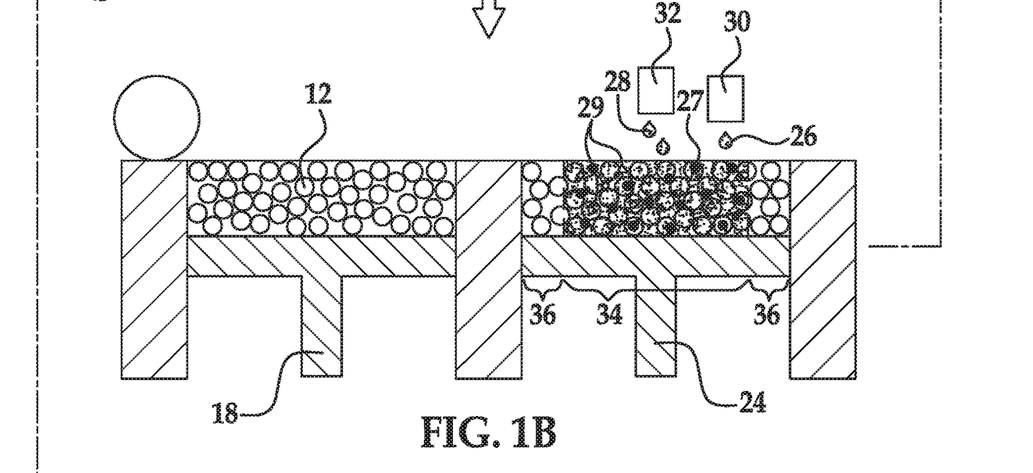
Figure 1C:
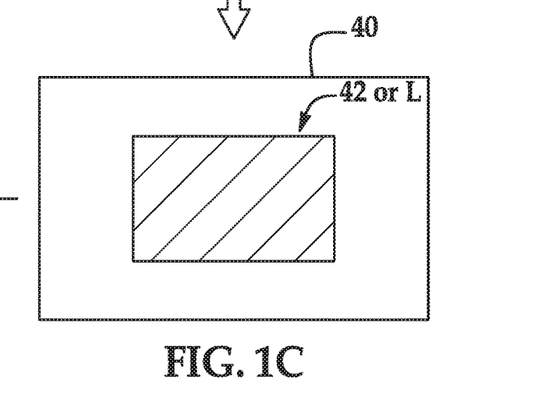

An example of the 3D printing method is schematically depicted in FIGS. 1A through 1C. As shown in FIG. 1A, the method includes applying a build material 12 using a 3D printing system 10. In the example shown in FIG. 1A, one layer 14 of the build material 12 has been applied, as will be discussed in more detail below.

The build material 12 may be any ceramic particles. Examples of suitable ceramic particles include metal oxides, inorganic glasses, carbides, nitrides, and borides. Some specific examples include alumina ($Al_2O_3$), $Na_2O/CaO/SiO_2$ glass (soda-lime glass), silicon mononitride (SiN), silicon dioxide ($SiO_2$), zirconia ($ZrO_2$), titanium dioxide ($TiO_2$), glass frit materials, or combinations thereof. As an example of one suitable combination, 30 wt % glass may be mixed with 70 wt % alumina. In some examples, the ceramic build material 12 has low absorptivity of the energy that is applied during 3D printing. One example of low absorptivity is that the ceramic build material 12 has a loss tangent of <0.01 or <0.02 (at ambient conditions) for the wavelength of energy that is applied or at the frequency of the energy that is applied. Ambient conditions include the air temperature of any environment where a human can function comfortably without means of protection, e.g., from about 18° C. to about 30° C.).

The build material 12 may have a melting point ranging from about 200° C. to about 2800° C. As examples, the build material 12 may be a glass frit having a melting point of about 220° C., or a metal oxide having a melting point ranging from about 1000° C. to about 2800° C.

The build material 12 may be made up of similarly sized particles or differently sized particles. The particle size of the build material 12 may be 100 nm or higher. In an example, the particle size of the build material particles 12 is greater than or equal to 10 μm for materials with a bulk density of greater than or equal to 3. For lower density particles, the particle size can be much larger. In an example, the particle size of the ceramic build materials 12 ranges from about 10 μm to about 500 μm. In another example, the particle size of the build material particles 12 ranges from about 30 μm to about 500 μm. It is to be understood that particle sizes of less than 1 μm are possible if the build material 12 is spread using a slurry based process.

In an example, the ceramic build material 12 is a dry powder.

In the example shown at FIG. 1A, applying the build material 12 includes the use of the printing system 10. The printing system 10 may include a supply bed 16 (including a supply of the build material 12), a delivery piston 18, a roller 20, a fabrication bed 22 (having a contact surface 23), and a fabrication piston 24. Each of these physical elements may be operatively connected to a central processing unit or controller (not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object 42 (FIG. 1C). The data for the selective delivery of the build material 12, the sintering aid/fixer fluid 26 (FIG. 1B), the liquid functional material 28 (FIG. 1B), etc. may be derived from a model of the 3D object 42 to be formed. For example, the instructions may cause the controller to utilize a build material distributor to dispense a layer 14 of the build material 12, and to utilize applicator(s) 30, 32 (FIG. 1B) (e.g., inkjet applicator(s)) to selectively dispense the sintering aid/fixer fluid 26 and the liquid functional material 28.

The delivery piston 18 and the fabrication piston 24 may be the same type of piston, but are programmed to move in opposite directions. In an example, when a layer of the 3D object 42 is to be formed, the delivery piston 18 may be programmed to push a predetermined amount of the build material 12 out of the opening in the supply bed 16, and the fabrication piston 24 may be programmed to move in the opposite direction of the delivery piston 18 in order to increase the depth of the fabrication bed 22. The delivery piston 18 will advance enough so that when the roller 20 pushes the build material 12 into the fabrication bed 22 and onto the contact surface 23, the depth of the fabrication bed 22 is sufficient so that a layer 14 of the build material 12 may be formed in the bed 22. The roller 20 is capable of spreading the build material 12 into the fabrication bed 22 to form the layer 14, which is relatively uniform in thickness. In an example, the thickness of the layer 14 ranges from about 90 μm to about 110 μm, although thinner or thicker layers may also be used. For example, the thickness of the layer 14 may range from about 20 μm to about 200 μm, or from about 50 μm to about 1000 μm.

It is to be understood that the roller 20 is a build material distributor that may be replaced by other tools, such as a blade that may be useful for spreading different types of powders, or a combination of a roller and a blade.

The supply bed 22 that is shown is one example, and could be replaced with another suitable delivery system to supply the build material 12 to the fabrication bed 22. Examples of other suitable delivery systems or distributors include a hopper, an auger conveyer, or the like.

The fabrication bed 22 that is shown is also one example, and could be replaced with another support member, such as a platen, a print bed, a glass plate, or another build surface.

After the build material 12 is applied, the sintering aid/fixer fluid 26 and the liquid functional material 28 are respectively and selectively applied, as shown at FIG. 1B.

The sintering aid/fixer fluid 26 is an aqueous (i.e., water) based fluid including the cationically stabilized amphoteric alumina particulate material 27. The cationically stabilized amphoteric alumina particulate material 27 has a particle size of 200 nm or less. In an example, the particle size of the cationically stabilized amphoteric alumina particulate material 27 ranges from 3 nm to 200 nm. In still another example, the particle size of the cationically stabilized amphoteric alumina particulate material 27 ranges from 5 nm to 150 nm. In yet a further example, the particle size of the cationically stabilized amphoteric alumina particulate material 27 ranges from about 40 nm to about 50 nm or from about 10 nm to about 13 nm.

Amphoteric alumina particulate materials begin to acquire some positive charges at the surface in an aqueous environment at a pH less than 9.0 or 10.0. However, the amphoteric alumina particulate materials become predominantly negatively charged at a pH greater than 6.0. It has been found that in the examples disclosed herein, the amphoteric alumina particulate materials become cationically stabilized at a pH ranging from about 3.5 to about 5.0. At this pH range, the amphoteric alumina particulate materials are predominantly cationic. For example, the positive charges at the surface of the cationically stabilized amphoteric alumina particulate materials 27 may range from about 15% to about 85% (although the percentage may vary for different aluminum oxide types and grades). Also at this pH range, the negative charges at the surface of the cationically stabilized amphoteric alumina particulate materials 27 may be less than 8%. As such, the sintering aid/fixer fluid 26 has a pH ranging from about 3.5 to about 5.0 so that the cationically stabilized amphoteric alumina particulate materials 27 remain cationically stabilized until they contact the liquid functional material 28. Also at this moderately acidic pH, strong electrostatic repulsion between the cationically stabilized amphoteric alumina particulate materials 27 drives the dispersion viscosity of the sintering aid/fixer fluid 26 down and thus improves jettability of the sintering aid/fixer fluid 26.

The cationically stabilized amphoteric alumina particulate material 27 may be added to the sintering aid/fixer fluid 26 in the form of an alumina dispersion.

The alumina dispersion may be formed from an aqueous vehicle (having the suitable acidic pH) and amphoteric alumina particulate materials. The amphoteric alumina particulate materials may be a water-dispersible alumina (e.g., boehmite) nano-powder, which is a dry powder. An example of the water-dispersible alumina nano-powder is DISPERAL® alumina (boehmite—AlO(OH)) powder, which is commercially available from Sasol GmbH. In one example, the alumina dispersion may be prepared by adding the water-dispersible alumina nano-powder to the aqueous vehicle. The aqueous vehicle may include deionized water and a pH adjusting agent present in an amount sufficient to render the pH from about 3.5 to about 5.0.

The mixture of the aqueous vehicle and the amphoteric alumina particulate materials may be milled to form positive charges on the amphoteric alumina particulate materials, to reduce the average particle size of the cationically stabilized amphoteric alumina particulate materials 27 to less than 50 nm, and to form the alumina dispersion. Any suitable milling technique may be used. In an example, an Ultra-Apex Bead Mill (Kotobuki Industries Co., Ltd) may be used with 50 μm YTZ beads. The linear rotor speed of the Ultra-Apex Bead Mill may range from about 6 m/s to about 10 m/s. In another example, a laboratory shaker may be used with 650 μm zirconium beads. In still another example, a Fritsch mill may be used with 200 μm zirconia beads. The rotor speed of the Fritsch mill may be 400 rotations per minute. In any of these examples, the mixture may be milled for about 1 hour to about 10 hours. Alternatively, in any of the above examples, the mixture may be alternated between being milled for about 1 minute to about 3 minutes and resting for about 3 minutes to about 10 minutes for about 100 repetitions to about 140 repetitions. The alumina dispersion may be collected from the beads. The resulting alumina dispersion may include about 20 wt % of the cationically stabilized amphoteric alumina particulate material 27.

In another example, the alumina dispersion may be prepared by milling (as described above) the amphoteric alumina particulate materials with water while adjusting the milled slurry pH to be from about 3.5 to about 5.0. The pH adjustment facilitates strong electrostatic repulsion between the particles of particulate material and acts as a milling aid. The alumina dispersion produced in this manner can be mixed with other vehicle components to form the sintering aid/fixer fluid 26, which has a liquid composition suitable for inkjet application.

In still other examples, the dry powder amphoteric alumina particulate materials are not readily dispersible. For these materials, the alumina dispersion may be prepared using high shear mixing. The alumina dispersion produced in this manner can be mixed with other vehicle components to form the sintering aid/fixer fluid 26, which has a liquid composition suitable for inkjet application.

The positive charges render the cationically stabilized amphoteric alumina particulate material 27 reactive by means of electrostatic attraction with the anionically stabilized susceptor material 29 in the liquid functional material 28 when the fluids 26, 28 come into contact with one another. Additionally, because of the presence of both cationic and anionic surface charges on the amphoteric alumina surface over a wide pH range, these materials 27 can also loosely aggregate between themselves as well as aggregate with the anionically stabilized susceptor material 29 and bridge all the materials 27, 29 together into larger flocs.

The cationically stabilized amphoteric alumina particulate material 27 is also capable of being sintered/fused with the build material 12.

The cationically stabilized amphoteric alumina particulate material 27 may be present in the sintering aid/fixer fluid 26 in an amount ranging from about 0.1 wt % to about 20 wt % based upon the total wt % of the sintering aid/fixer fluid 26. In an example, the sintering aid/fixer fluid 26 includes from about 0.5 wt % to about 10 wt % of the cationically stabilized amphoteric alumina particulate material 27. In another example, the detailing agent fluid 26 includes from about 2.5 wt % to about 7.5 wt % of the cationically stabilized amphoteric alumina particulate material 27.

Smaller weight percentages may be suitable for cationically stabilized amphoteric alumina particulate material 27 having a small particle size. For example, an inkjettable sintering aid/fixer fluid 26 may include from about 1 wt % to about 2 wt % of particulate materials 27 having a particle size ranging from about 3 nm to about 7 nm. In contrast, larger weight percentages may be suitable for cationically stabilized amphoteric alumina particulate material 27 having a large particle size. For example, an inkjettable sintering aid/fixer fluid 26 may include up to 20 wt % (and in some instances >20 wt %) of particulate materials 27 having a particle size ranging from about 50 nm to 100 nm or higher.

When the cationically stabilized amphoteric alumina particulate material 27 is contained in a solution or dispersion, the amount added may account for the weight percent of active cationically stabilized amphoteric alumina particulate material 27 in the solution or dispersion. For example, if the solution or dispersion includes 20% active cationically stabilized amphoteric alumina particulate material 27, and the target weight percent for the sintering aid/fixer fluid 26 is 10 wt %, the sintering aid/fixer fluid 26 may include about 50 wt % of the solution or dispersion.

In addition to water and the cationically stabilized amphoteric alumina particulate material 27, the sintering aid/fixer fluid 26 may also include co-solvent(s) and surfactant(s). The co-solvent(s) may be used to improve decap performance (i.e., the ability of the fluid to readily eject from a printhead, upon prolonged exposure to air), and the surfactant(s) may be used to quickly wet the build material 12.

Any co-solvent may be used that does not include a species that is capable of producing anions (which could prematurely precipitate the cationically stabilized amphoteric alumina particulate material 27). Classes of organic co-solvents that may be used include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point ranging from about 123° C. to about 125° C.), and combinations thereof. The co-solvent(s) may be present in the sintering aid/fixer fluid 26 in a total amount ranging from about 1 wt % to about 30 wt % based upon the total wt % of the sintering aid/fixer fluid 26. In an example, the sintering aid/fixer fluid 26 includes about 16 wt % of 2-pyrrolidone. In another example, the sintering aid/fixer fluid 26 includes about 16 wt % of 2-pyrrolidone and about 9 wt % of 2-methyl-1,3-propanediol.

Examples of suitable surfactants include nonionic surfactants. Some specific examples of nonionic surfactants include a nonionic fluorosurfactant (e.g., CAPSTONE® fluorosurfactants (previously known as ZONYL FSO), such as CAPSTONE® FS-31, from DuPont), a secondary alcohol ethoxylate, nonionic surfactant (e.g., TERGITOL™ 15-S-9, TERGITOL™ 15-S-7, TERGITOL™ 15-S-5, each of which is available from The Dow Chemical Co.), a nonionic, ethoxylated low-foam wetting agent (e.g., SURFYNOL® 440 from Air Products and Chemicals, Inc.), an ethoxylated wetting agent and molecular defoamer (e.g., SURFYNOL® 420 from Air Products and Chemicals, Inc.), an alkoxylated alcohol (e.g., TEGO® Wet 510 from Evonik Industries AG), a self-emulsifiable, nonionic wetting agent based on acetylenic diol chemistry (e.g., SURFYNOL® SEF from Air Products and Chemicals, Inc.), a nonionic, acetylenic diol surface active agent (e.g., SURFYNOL® 104 from Air Products and Chemicals, Inc.), and combinations thereof. The surfactant(s) may be present in the sintering aid/fixer fluid 26 in a total amount ranging from about 0.05 wt % to about 5 wt % based upon the total wt % of the sintering aid/fixer fluid 26. In an example, the sintering aid/fixer fluid 26 includes up to 2 wt % of the surfactant. When the surfactant is contained in a solution or dispersion, the amount added may account for the weight percent of active surfactant in the solution or dispersion. For example, if the solution or dispersion includes 2% active surfactant, and the target weight percent for the sintering aid/fixer fluid 26 is 0.2 wt %, the sintering aid/fixer fluid 26 may include about 10 wt % of the solution or dispersion. In an example, the sintering aid/fixer fluid 26 includes about 0.4 wt % of TERGITOL™ 15-S-7. In another example, the sintering aid/fixer fluid 26 includes about 0.5 wt % of TERGITOL™ 15-S-7 and about 0.4 wt % of CAPSTONE® FS-31.

The balance of the sintering aid/fixer fluid 26 is water (e.g., deionized water). As such, the amount of water may vary depending upon the weight percent of the other sintering aid/fixer fluid components.

Some examples of the sintering aid/fixer fluid 26 may include antimicrobial agent(s) or other suitable additives. However, it is to be understood that the sintering aid/fixer fluid 26 disclosed herein does not include any components with anionic or potentially anionic charges capable of destabilizing the cationically stabilized amphoteric alumina particulate material 27 present therein.

The liquid functional material 28 is an aqueous (i.e., water) based fluid including the anionically stabilized susceptor material 29. The anionically stabilized susceptor material 29 may have a loss tangent of <0.01 or <0.02 (at ambient conditions) for the wavelength of energy that is applied or at the frequency of the energy that is applied during 3D printing. As an example, the anionically stabilized susceptor material may have a loss tangent of >0.01 within a range of microwave radiation frequencies (e.g., 300 MHz to 300 GHz). As another example, the anionically stabilized susceptor material may have a loss tangent of >0.01 within a range of microwave and RF radiation frequencies (e.g., 5 kHz to 300 GHz).

The anionically stabilized susceptor material 29 may be carbon black particles having negatively charged groups at a surface of the particle (i.e., self-dispersed carbon black particles), carbon black particles having a negatively charged polymeric dispersant absorbed to a surface of the particle, ferromagnetic metal oxide particles having an anionic dispersing species absorbed to a surface of the particle, semiconductor or conductive oxide particles having an anionic dispersing species absorbed to a surface of the particle, and combinations thereof. The negatively charged groups at the surface of carbon black particles may be deprotonized carboxylic (—COOH), sulfo (—$SO_3H$), or other acidic groups. An example of commercially available carbon black particles having negatively charged groups at the surface of the particles is CAB-O-JET® 300 (available from Cabot Corp.). The negatively charged polymeric dispersant absorbed to the surface of carbon black particles may be water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.) or water-soluble styrene-maleic anhydride copolymers/resins. The ferromagnetic metal oxide particles may be magnetite ($Fe_3O_4$) or complex ferrites (e.g., $Fe_2O_3/CoO/Mn_2O_3$ particles including $Fe_2O_3$, CoO, and $Mn_2O_3$). It is to be understood that other ferromagnetic materials may also be used. The semiconductor or conductive oxide particles (e.g., ceramic material with electrical conductivity or semiconductor properties used in particulate state) may include CoO, CuO, SiC, or other oxide and non-oxide ceramics with appropriate electrical conductivity attributes. The anionic dispersing species absorbed to the surface of the ferromagnetic metal oxide particles or the semiconductor or conductive oxide particles may be multi-carboxylic organic acids (e.g., citric acid), phosphate ions, or water-soluble polymers containing carboxylic groups or sulfo groups (i.e., polycarboxylates or polysulfonates).

The negatively charged groups and/or species provide negative charges at the surface of the anionically stabilized susceptor material 29. The negative charges render the anionically stabilized susceptor material 29 reactive by means of electrostatic attraction with the cationically stabilized amphoteric alumina particulate material 27 in the sintering aid/fixer fluid 26 when the fluids 26, 28 come into contact with one another. The anionically stabilized susceptor material 29 may be present in the liquid functional material 28 in an amount ranging from about 1 wt % to about 60 wt % based upon the total wt % of the liquid functional material 28. When the anionically stabilized susceptor material 29 is contained in a solution or dispersion, the amount added may account for the weight percent of active anionically stabilized susceptor material in the solution or dispersion. For example, if the solution or dispersion includes 15% active anionically stabilized susceptor material, and the target weight percent for the liquid functional material 28 is 8.0 wt %, the sintering aid/fixer fluid 26 may include about 53 wt % of the solution or dispersion.

In addition to water and the anionically stabilized susceptor material 29, the liquid functional material 28 may also include co-solvent(s) and/or surfactant(s).

The liquid functional material 28 may include an organic co-solvent present in total in the liquid functional material 28 in an amount ranging from about 5 wt % to about 20 wt % (based on the total wt % of the liquid functional material 28). It is to be understood that other amounts outside of this range may also be used depending, at least in part, on the jetting architecture used to dispense the liquid functional material 28. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the liquid functional material 28 may include 2-pyrrolidone.

The liquid functional material 28 may also include surfactant(s). As an example, the liquid functional material 28 may include non-ionic and/or anionic surfactants, which may be present in an amount ranging from about 0.01 wt % to about 5 wt % based on the total wt % of the liquid functional material 28 (the amount of which may account for the percent of actives in a solution or dispersion). Any of the previously listed non-ionic surfactants may be used in the liquid functional material 28.

The balance of the liquid functional material 28 is water (e.g., deionized water). As such, the amount of water may vary depending upon the weight percent of the other liquid functional material components.

The liquid functional material 28 may also include anti-microbial agent(s), anti-kogation agent(s), chelating agent(s), and/or other additives.

The liquid functional material 28 may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, and combinations thereof. In an example, the material 28 may include a total amount of antimicrobial agents that ranges from about 0.1 wt % to about 0.25 wt %.

An anti-kogation agent may also be included in the liquid functional material 28. Kogation refers to the deposit of dried solids on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3 A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the material 28 in an amount ranging from about 0.1 wt % to about 1 wt % of the total wt %.

The liquid functional material 28 may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the material 28 may range from 0 wt % to about 1 wt % based on the total wt %.

In the examples of the method shown in FIGS. 1A through 10, the sintering aid/fixer fluid 26 and the liquid functional material 28 are applied to the same portion(s) 34 of the build material 12 in the layer 14. Within these portion(s) 34, the sintering aid/fixer fluid 26 and the liquid functional material 28 penetrate at least some of the voids between the build material particles 12 and come into contact with each other. At these portion(s) 34, and when the fluids 26, 28 contact each other, the cationically stabilized amphoteric alumina particulate material 27 and the anionically stabilized susceptor material 29 co-precipitate out of the respective fluids 26, 28, which restricts the motion (i.e., prevents spreading) of the cationically stabilized amphoteric alumina particulate material 27 and the anionically stabilized susceptor material 29.

The sintering aid/fixer fluid 26 and the liquid functional material 28 may be selectively applied at any portion 34 of the build material 12 where sintering/fusing is desirable. For example, the sintering aid/fixer fluid 26 and the liquid functional material 28 may be selectively applied according to the pattern of a cross-section (which is parallel to the contact surface 23) for the layer of the 3D object 42 that is to be formed. In the example shown in FIG. 1B, the shape of the 3D object layer to be formed is a cube or a rectangular prism, and the pattern of the cross-section that is parallel to the contact surface 23 is a square or rectangle.

The sintering aid/fixer fluid 26 and the liquid functional material 28 may be applied in any suitable manner that will result in mixing of the fluids 26, 28 before the anionically stabilized susceptor material 29 has migrated out of the patterned portion 34. In an example, the sintering aid/fixer fluid 26 may be applied at the same time that the liquid functional material 28 is applied, using a single printing pass or using multiple printing passes. In other words, the sintering aid/fixer fluid 26 and the liquid functional material 28 may be applied simultaneously. In another example, it may be suitable to print the fluids 26, 28 with a minor lag time (e.g., less than 30 seconds) between application of the respective fluids 26, 28. In this example, it may be more desirable to print the sintering aid/fixer fluid 26 before the liquid functional material 28.

As depicted in FIG. 1B, the sintering aid/fixer fluid 26 and the liquid functional material 28 may be dispensed from respective applicators 30, 32. While not shown, the sintering aid/fixer fluid 26 and the liquid functional material 28 may also be dispensed from a single applicator, having a first set of nozzles (or other delivery mechanism) configured to deliver the sintering aid/fixer fluid 26, and a second set of nozzles (or other delivery mechanism) configured to deliver the liquid functional material 28.

The applicators 30, 32 may be inkjet applicators. Examples of suitable inkjet applicators include a thermal inkjet printhead or a piezoelectric inkjet printhead. The printhead may be a drop-on-demand printhead or a continuous drop printhead. The applicators 30, 32 may deliver drops of the sintering aid/fixer fluid 26 and the liquid functional material 28 at a resolution ranging from about 300 dots per inch (DPI) to about 1200 DPI. In other examples, the applicators 30, 32 may be able to deliver drops of the sintering aid/fixer fluid 26 and the liquid functional material 28 at a higher or lower resolution. The drop velocity may range from about 5 m/s to about 24 m/s and the firing frequency may range from about 1 kHz to about 100 kHz. The applicators 30, 32 may include an array of nozzles through which it is able to selectively eject drops of the respective fluids 26, 28. In one example, each drop may be in the order of about 10 pico liters (pi) per drop, although it is contemplated that a higher or lower drop size may be used. In some examples, applicators 30, 32 are able to deliver variable size drops of the respective fluids 26, 28.

The applicators 30, 32 may be attached to a moving XY stage or a translational carriage (neither of which is shown) that moves the applicators 30, 32 adjacent to the build material 12 in order to deposit the respective fluids 26, 28 in desirable portions(s) 36, 34. In other examples, the applicators 30, 32 may be fixed while a support member (supporting the build material 12) is configured to move relative thereto. The applicators 30, 32 may be programmed to receive commands from a central processing unit and to deposit the respective fluids 26, 28 according to a pattern of a particular layer of the 3D object 42.

In an example, the applicators 30, 32 may have a length that enables it to span the whole width of the member (e.g., the fabrication bed 22) supporting the build material 12 in a page-wide array configuration. As used herein, the term 'width' generally denotes the shortest dimension in the plane parallel to the X and Y axes of the support member, and the term 'length' denotes the longest dimension in this plane. However, it is to be understood that in other examples the term 'width' may be interchangeable with the term 'length'.

In an example, the page-wide array configuration is achieved through a suitable arrangement of multiple applicators 30, 32. In another example, the page-wide array configuration is achieved through a single applicator 30 or 32. In this other example, the single applicator 30 or 32 may include an array of nozzles (some of which dispense the sintering aid/fixer fluid 26 and others of which dispense the liquid functional material 28) having a length to enable them to span the width of the support member. This configuration may be desirable for single pass printing. In still other examples, the applicators 30, 32 may have a shorter length that does not enable them to span the whole width of the support member. In these other examples, the applicators 30, 32 may be movable bi-directionally across the width of the support member. This configuration enables selective delivery of the respective fluids 26, 28 across the whole width and length of the support member using multiple passes.

After the sintering aid/fixer fluid 26 and liquid functional material 28 are applied in the desired portion(s) 34, the entire layer 14 of the build material 12 may be exposed to microwave or RF radiation or thermal energy. This is shown at FIG. 10.

Microwave or RF radiation exposure may be accomplished using any microwave or RF radiation source 40. Examples of the microwave or RF radiation source 40 include a microwave or RF furnace, microwave or RF generators, radars, or the like. The microwave or RF radiation used may have a frequency ranging from about 5 kHz to about 300 GHz. Specifically, the microwave radiation used may have a frequency ranging from about 300 MHz to about 300 GHz. Thermal energy exposure may be accomplished using any conventional thermal furnace. The length of time the microwave or RF radiation or thermal energy is applied for, or energy exposure time, may be dependent, for example, on one or more of: characteristics of the radiation source 40 or thermal energy source; characteristics of the build material 12; and/or characteristics of the liquid functional material 28.

The liquid functional material 28 (and in particular, the anionically stabilized susceptor material 29) enhance(s) the absorption of the microwave or RF radiation, convert(s) the absorbed microwave or RF radiation to thermal energy, and promote(s) the transfer of the thermal heat to the build material 12 and the cationically stabilized amphoteric alumina particulate material 27 in contact therewith (i.e., in the portion(s) 34). In an example, the liquid functional material 28 sufficiently elevate(s) the temperature of the build material 12 and the cationically stabilized amphoteric alumina particulate material 27, allowing fusing or sintering of the build material particles 12 and cationically stabilized amphoteric alumina particulate material 27 in contact with the liquid functional material 28 to take place. In an example, the liquid functional material 28 is able to absorb and transfer to the build material 12 and the cationically stabilized amphoteric alumina particulate material 27 in contact therewith enough thermal energy to heat the build material 12 and the cationically stabilized amphoteric alumina particulate material 27 to a temperature ranging from about 200° to about 2500° C. In an example, the temperature is elevated about 50° C. above the melting temperature of the build material 12 and the melting temperature of the cationically stabilized amphoteric alumina particulate material 27. In another example, the liquid functional material 28 may cause heating of the build material 12 and the cationically stabilized amphoteric alumina particulate material 27 below the respective melting points, but to a temperature suitable to cause sintering and bonding (e.g., to a temperature ranging from about 40% to about 90% of the melting point of the build material 12 and the cationically stabilized amphoteric alumina particulate material 27). It is to be understood that portions 36 of the build material 12 that do not have the liquid functional material 28 applied thereto may not absorb enough energy to fuse or sinter. Exposure to microwave or RF radiation forms the 3D object 42 (or one layer L of a 3D object), as shown at FIG. 1C.

The sintering aid/fixer fluid 26 may also increase the sintering rate, and thus may act as a fusing aid (i.e., lowers the temperature at which sintering, fusing, binding, curing, etc. of the build material 12 takes place). As such, thermal energy (instead of microwave or RF radiation) may be used to sufficiently elevate(s) the temperature of the build material 12 and the cationically stabilized amphoteric alumina particulate material 27, allowing fusing or sintering of the build material particles 12 and cationically stabilized amphoteric alumina particulate material 27 to take place.

Several examples of the method are shown in FIGS. 1A through 1C. One example of the method involves performing the processes at FIGS. 1A through 10 sequentially to form a single layer 3D object 42. Another example of the method 100 involves repeating the processes at FIGS. 1A and 1B to form a green body (with multiple layers 14, each of which has sintering aid/fixer fluid 26 and liquid functional material 28 thereon) before exposing the green body to microwave radiation to form the 3D object 42 (i.e., before performing the process at FIG. 1C). Still another example of the method 200 is a layer by layer process. The layer by layer process involves exposing the layer 14 (having sintering aid/fixer fluid 26 and liquid functional material 28 thereon) to microwave or RF radiation or thermal energy to form a solidified layer L of a 3D object that is to be formed, before forming any additional layers of the 3D object.

In the example of the method 100, the green body may be formed before exposure to microwave or RF radiation or thermal energy. A single layered green body (i.e., layer 14 having both sintering aid/fixer fluid 26 and liquid functional material 28 applied thereto) is shown in FIG. 1B. It is to be understood that the green body (and thus the resulting 3D object 42) may be built up to include several layers. Each additional layer of the green body may be formed by repeating FIGS. 1A and 1B. For example, to form an additional layer of the green body, an additional layer of the build material 12 may be applied to the layer 14 (having both sintering aid/fixer fluid 26 and liquid functional material 28 applied thereto), and the additional layer may have the sintering aid/fixer fluid 26 and the liquid functional material 28 selectively applied thereto at the same portion(s). Any number of additional layers may be formed by repeating FIGS. 1A and 1B. Once the desirable number of layers is formed, the green body is complete and the entire volume of the green body may be exposed to microwave or RF radiation or thermal energy (FIG. 1C).

The formation of the green body prior to microwave or RF radiation or thermal energy exposure (i.e., method 100) may be suitable for certain build materials 12. For example, the formation of the green body prior to radiation/energy exposure may be used for the ceramic build materials having higher melting points. The thermal stress associated with fusing layer by layer (as shown at reference numeral 200) may be too high for ceramics with high melting points.

When the method 100 is utilized, the green body may be removed from the fabrication bed 22 and placed in or within proximity of a suitable microwave or RF radiation source 40 for microwave or RF radiation exposure or a suitable thermal energy source for thermal energy exposure. Alternatively, the green body may remain in the fabrication bed 22 and be exposed to microwave or RF radiation or thermal energy.

Radiation with wavelengths shorter than microwave radiation and with frequencies higher than microwave radiation may not be suitable for the method 100 because the radiation may not be able to penetrate the volume of material in the green body. However, the radiation used in the method 100 may be thermal energy, for example, when the sintering aid/fixer fluid 26 is capable of enhancing fusing of the green body at elevated temperatures (i.e., acts as a fusing aid).

With the method 100, several heating stages may be used, e.g., an initial, lower temperature heating to cure the green body (e.g., render the green body mechanically stable enough to be extracted from the fabrication bed 22), followed by higher temperature sintering (e.g., to achieve final densification and material properties).

In the example of the method 200, sequentially performing the processes at FIGS. 1A, 1B and 1C forms one layer L of the 3D object 42. In this example of the method 200, each of the processes at FIGS. 1A, 1B, and 1C may be repeated to form additional layers, and ultimately the 3D object 42. For example, to form an additional layer of the 3D object 42, an additional layer of the build material 12 may be applied to the layer L shown in FIG. 10, the additional layer may have sintering aid/fixer fluid 26 and the liquid functional material 28 selectively applied thereto at the same portion(s), and the additional layer may be exposed to microwave or RF radiation or thermal energy. Any number of additional layers may be formed in this manner. For the layer by layer method 200, it is to be understood that thermal energy or electromagnetic radiation with wavelengths shorter than microwave radiation and with frequencies higher than microwave radiation may be particularly desirable.

The layer by layer method (i.e., method 200) may also be suitable for certain build materials 12. Whether a ceramic build material 12 may be used in the layer by layer method may depend upon the melting point of the material 12, the ambient temperature in the print region, and the ability of the material 12 to endure thermal shock. For example, the method 200 may be used for ceramic materials with lower melting points (e.g., soda-lime glass, glass frit, etc.). As an example, a lower melting point may be 700° C. or lower. When the method 200 is utilized, the layers of the 3D object 42 may remain in the fabrication bed 22 and the microwave radiation source 40 may be positioned within proximity of the fabrication bed 22. When the method 200 is utilized and the 3D object 42 is complete, it may be removed from the fabrication bed 22, and any uncured build material 12 may be removed.

Referring now to FIGS. 2A through 2D, another example of the 3D printing method is depicted. This example of the method is similar to the method 100, and illustrates the formation of the green body 44 at FIG. 2C.

In this example, a first layer 14 of the build material 12 is applied to the fabrication bed 22. The first layer 14 may be applied as previously described in reference to FIG. 1A.

Figure 2A:
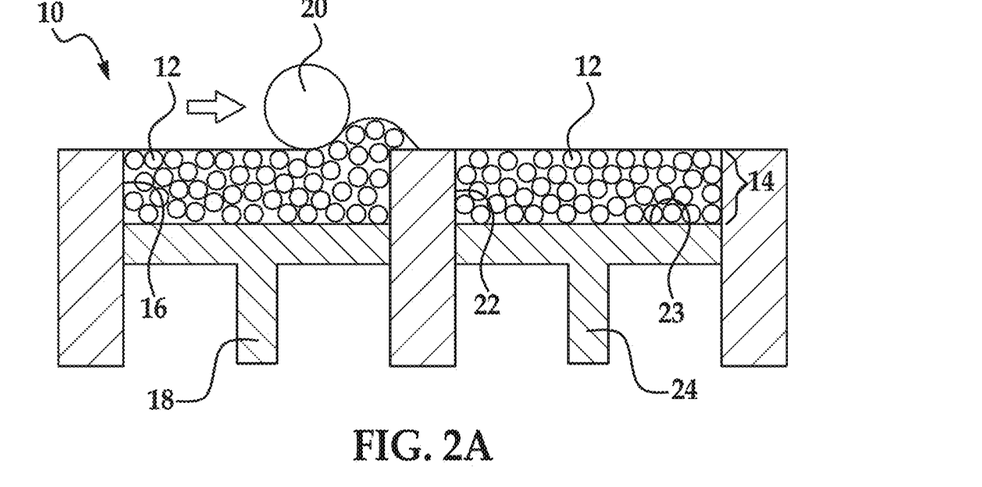
FIGS. 2A through 2D are schematic cross-sectional views depicting the formation of layer(s) of a 3D object using an example of a 3D printing method disclosed herein.
Figure 2B:
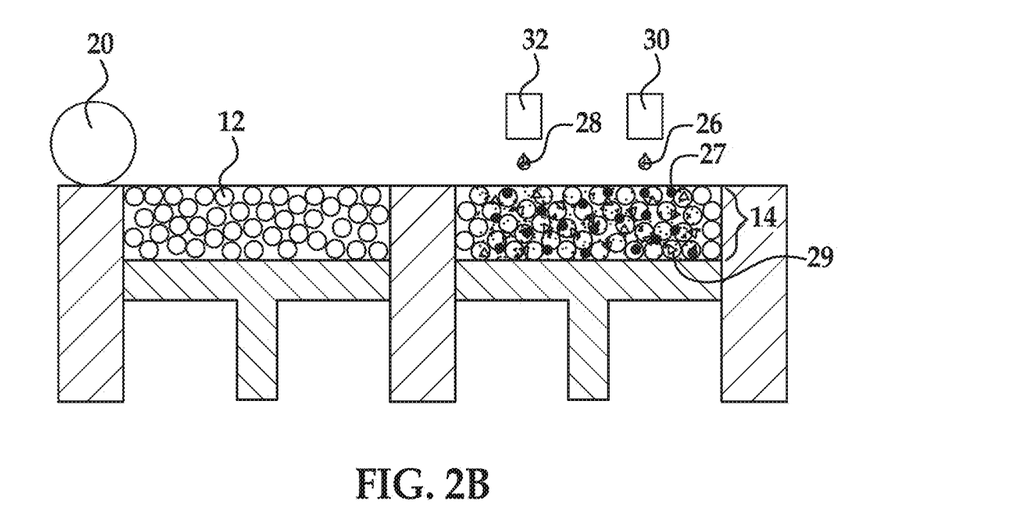

In this example of the method, the sintering aid/fixer fluid 26 and the liquid functional material 28 are applied to pattern the first layer 14 of the build material 12, and to form the first layer of the green body 44. The sintering aid/fixer fluid 26 and the liquid functional material 28 may be applied to at least some of the build material 12 in the first layer 14 via the applicators 30, 32.

Figure 2C:
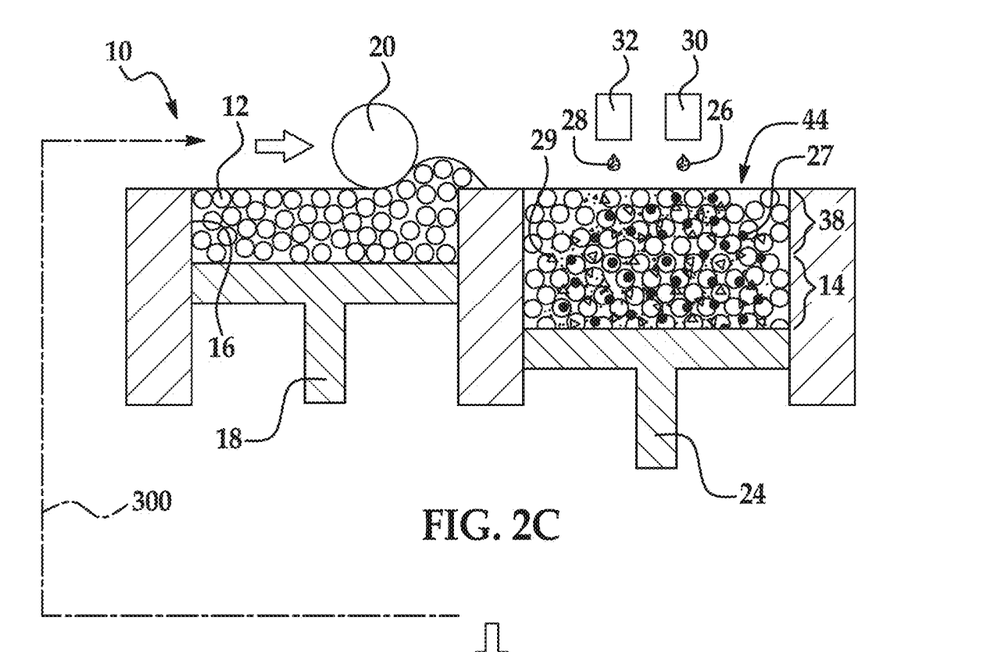

Referring now to FIG. 2C, two additional processes are shown, namely the formation of the second layer 38 of build material 12 on the first layer 14, and the application of the sintering aid/fixer fluid 26 and the liquid functional material 28 to the second layer 38.

In this example, the second layer 38 of the build material 12 is applied to the first layer 14 in the fabrication bed 22. The second layer 38 may be applied as previously described.

The sintering aid/fixer fluid 26 and the liquid functional material 28 are applied to pattern the second layer 38 of the build material 12, and to form the second layer of the green body 44. The sintering aid/fixer fluid 26 and the liquid functional material 28 may be applied to at least some of the build material 12 in the second layer 38 via the applicators 30, 32. It is to be understood that the pattern of the first layer 14 and the pattern of the second layer 38 may be the same or different.

In both the first and second layers 14, 38, the sintering aid/fixer fluid 26 and the liquid functional material 28 come into contact with each other. When the fluids 26, 28 contact each other, the cationically stabilized amphoteric alumina particulate material 27 and the anionically stabilized susceptor material 29 co-precipitate out of the respective fluids 26, 28, which restricts the motion (i.e., prevents spreading) of the cationically stabilized amphoteric alumina particulate material 27 and the anionically stabilized susceptor material 29 to the portion(s) of the build material 12 to which the fluids 26, 28 have been applied.

Figure 2D:
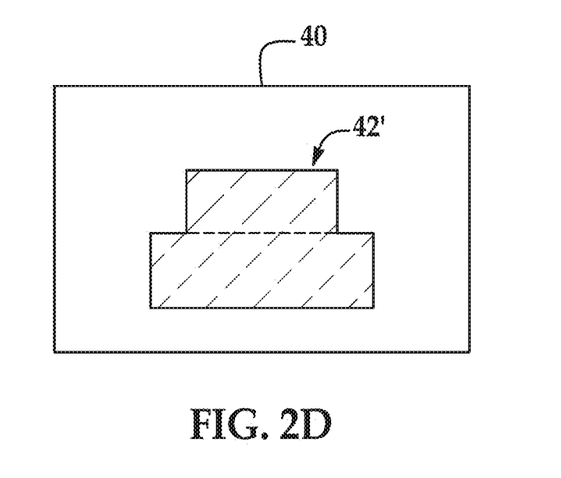

It is to be understood that the green body 44 may be built up to include several layers. Any number of additional layers of the green body 44 may be formed by repeating the application of build material 12, sintering aid/fixer fluid 26 and liquid functional material 28 of FIG. 2C. Once the desirable number of layers is formed, the green body 44 is complete and may be exposed to microwave or RF radiation or thermal energy (FIG. 2D). Microwave or RF radiation or thermal energy exposure may be accomplished as previously described.

During microwave or RE radiation exposure, the liquid functional material 28 (and in particular, the anionically stabilized susceptor material 29) enhance(s) the absorption of the microwave or RF radiation, convert(s) the absorbed microwave or RF radiation to thermal energy, and promote(s) the transfer of the thermal heat to the build material 12 and the cationically stabilized amphoteric alumina particulate material 27 in contact therewith. The sintering aid/fixer fluid 26 may increase the sintering rate of the build material 12 in contact therewith, and thus thermal energy may be used to sufficiently elevate(s) the temperature of the build material 12 and the cationically stabilized amphoteric alumina particulate material 27, allowing fusing or sintering of the build material particles 12 and cationically stabilized amphoteric alumina particulate material 27 to take place. Exposure to radiation or thermal energy forms the 3D object 42', as shown at FIG. 2D.

The various examples of the method disclosed herein enable a high solids content to be delivered to desirable portion(s) of the build material 12 by maintaining the cationically stabilized amphoteric alumina particulate material 27 and the anionically stabilized susceptor material 29 in those portion(s). By keeping the anionically stabilized susceptor material 29 in the areas that are to be fused or sintered, the edge acuity and overall dimensional accuracy of the 3D object that is formed may be improved.

To further illustrate the present disclosure, examples are given herein. It is to be understood that these examples are provided for illustrative purposes and are not to be construed as limiting the scope of the present disclosure.

EXAMPLES

Example 1

A sintering aid/fixer fluid was prepared with the composition shown in Table 1.

TABLE 1

| Ingredient | Specific component | Actives Wt % | Target Wt % | Formulation Wt % |
|---|---|---|---|---|
| Co-solvent | 1-(2-Hydroxyethyl)-2-pyrrolidone | 100% | 22% | 22% |
| Surfactant | SURFYNOL ®104 | 100% | 0.2% | 0.2% |
| cationically stabilized amphoteric alumina particulate material | Milled dispersion of SPECTRAL ®-51* fumed alumina (Mv ~52 nm) | 26.67% | 12% | 45% |
| Water | | | 32.8% | 32.8% |

*Available from Cabot Corp.

A liquid functional material (including a complex ferrite of iron, cobalt and manganese oxides) was utilized. The composition of the liquid functional material is shown in Table 2.

TABLE 2

| Ingredient | Specific component | Formulation Wt % |
|---|---|---|
| Co-solvents | 2-pyrrolidone | 10.00 |
| | DANTOCOL ® DHE* | 10.00 |
| Surfactant | SURFYNOL ® 465 | 0.20 |
| Anionically stabilized susceptor material | Proprietary Co—Mn-Ferrite Dispersion (per dry ferrite mass) | 30.00 |
| Biocide | PROXEL ® GXL | 0.05 |
| Water | | Balance |

*Di-(2-Hydroxyethyl)-5,5-Dimethylhydantoin, available from Lonza, Inc.

This example was performed to characterize the spreading of the liquid functional material with and without the sintering aid/fixer fluid. The liquid functional material, and in some instances the sintering aid/fixer fluid, were dispensed as described below in a gear pattern including 4 holes of the same size on unfused powder beds composed of AA-18 alumina powder (available from Sumitomo) as the build material. Measurements of various features of the patterned (but not fused) build material were taken after the material(s) were dispensed. Control of the liquid functional material spread in the unfused powder bed is a first step in being able to properly define a fused 3D printed object.

For comparative printed build material 1 (which was a baseline for this experiment), one pass (2 12 ng drops of fluid were applied per pixel area with dimension ⅟₆₀₀×⅟₆₀₀ inch (about 13.5 g of fluid per m² (gsm))) of the liquid functional material was applied according to the gear pattern, and no sintering aid/fixer fluid was applied. The amount of liquid functional material used in this comparative example was not sufficient to cause significant spread beyond the defined edge of the printed part. This allowed for characterization of the printed pattern with a minimal amount of liquid functional material to establish what the best definition of the printed pattern could be.

For comparative printed build material 2, ten passes (for each pass, 2 12 ng drops of fluid were applied per pixel area with dimension 1/600×1/600 inch (about 13.5 g of fluid per m² (gsm))) of the liquid functional material was applied according to the gear pattern, and no sintering aid/fixer fluid was applied.

For the example printed build materials 1-4, ten passes (for each pass, 2 12 ng drops of fluid were applied per pixel area with dimension 1/600×1/600 inch (about 13.5 g of fluid per m² (gsm))) of the liquid functional material was applied according to the gear pattern, and from one to four passes (for each pass, 2 12 ng drops of fluid were applied per pixel area with dimension 1/600×1/600 inch (about 13.5 g of fluid per m² (gsm))) of the sintering aid/fixer fluid was applied in the same area as the liquid functional material according to the gear pattern.

Figure 3:
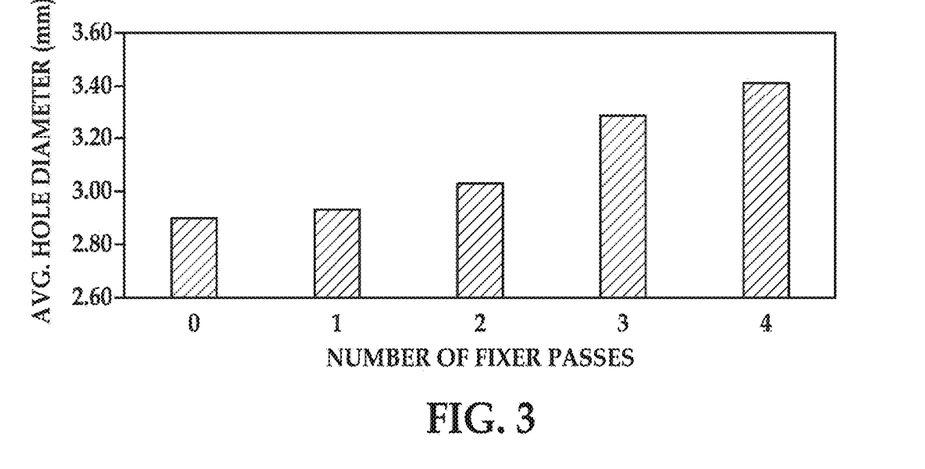
FIG. 3 is a graph depicting an average printed hole diameter for 3D objects printed with and without an example of the sintering aid/fixer fluid disclosed herein.

After the respective printed build materials were formed (but not fused), the diameter of the holes in the respective printed build materials was measured and averaged. The average hole diameter for comparative printed build material 1 was about 3.82 mm (data not shown in FIG. 3). The average hole diameter for comparative printed build material 2 shrunk by about 1 mm (compared to comparative printed build material 1). The average hole diameter for comparative printed build material 2 is shown in FIG. 3 as 0 number of fixer passes. The average hole diameters for example printed build materials 1-4 are respectively shown in FIG. 3 as 1-4 number of fixer passes. The results in FIG. 3 clearly illustrate that the sintering aid/fixer fluid disclosed herein improves part definition.

Example 2

A reference fusing aid and three example sintering aid/fixer fluids (SAFF) were prepared with the compositions shown in Table 3.

TABLE 3

| Specific component | Ref. Fusing Aid | SAFF 1 | SAFF 2 | SAFF 3 |
|---|---|---|---|---|
| Co-solvent #1(1-(2-Hydroxyethyl)-2-pyrrolidone) | 17% | 17% | 17% | 17% |
| Co-Solvent #2 (SILQUEST ® A-1230*) | 5% | 5% | 5% | 5% |
| Surfactant: SURFYNOL ® 465 | 0.2% | 0.2% | 0.2% | 0.2% |
| SNOWTEX ® ST-S $SiO_2$ (Mv ~2 nm) | 20.0% | None | None | None |
| AlO(OH) (DISPERAL ®HP14 milled to Mv ~30 nm) | None | None | 12% | 10% |
| $Al_2O_3$ (SPECTRAL ® 51 milled to Mv ~52 nm) | None | 15% | None | None |
| Water | Balance | Balance | Balance | Balance |
| pH | 8.5-9.0 | 3.8-4.2 | 3.8-4.2 | 3.8-4.2 |

*Reactive wetting and dispersing agent, available from Momentive Performance Materials Inc.
**Colloidal silica, available from Nissan Chemical Ind.

In this example, two liquid functional materials were used. The first liquid functional material was a black ink containing a carbon black dispersion as a radiation absorber. The second liquid functional material was the liquid functional material described in Example 1 (including a complex ferrite of iron, cobalt and manganese oxides).

Parts were formed with the reference fusing aid, and with each of the example SAFFs 1, 2, and 3. For all the parts, the build material used was AA-18 alumina powder (available from Sumitomo).

For each of the parts, a layer of build material was applied. For each pass of the respective materials, 13 grams per square meter (gsm) of the first liquid functional material, 19 gsm of the second liquid functional material, and 22 gsm of the reference fusing aid or example SAFFs 1, 2, and 3 were applied to the build material. The relative quantity of the reference fusing aid or example SAFFs 1, 2, and 3 was controlled by controlling the number of passes. The reference fusing aid was applied in 4 passes, SAFF 1 was applied in 4 passes, SAFF 2 was applied in 2 passes, and SAFF 3 was applied in 1 pass.

All of the parts were heated in a 1300 W multimode microwave furnace at 1450° C. for about 20 minutes.

Figure 4A:
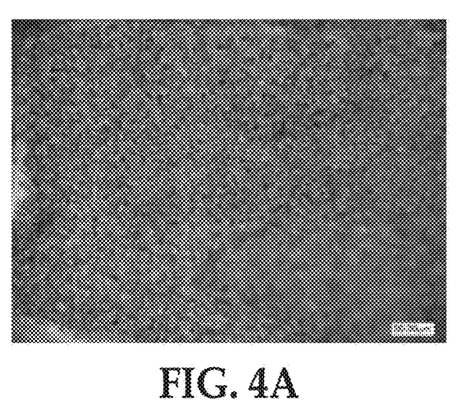
FIGS. 4A through 4D are cross-section microscopy photographs of 3D objects printed with a reference example $SiO_2$ fluid and examples of the sintering aid/fixer fluid disclosed herein, showing uniform (or non-uniform) distribution of particles that are delivered into the powder bed through the fluids.
Figure 4B:
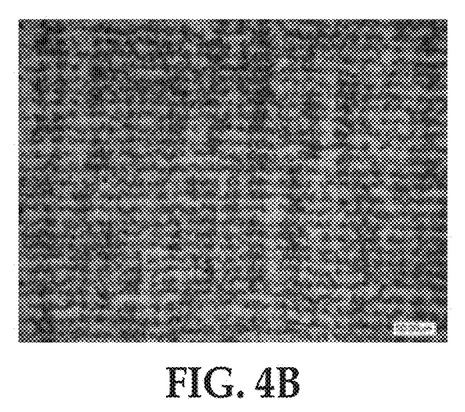
Figure 4C:
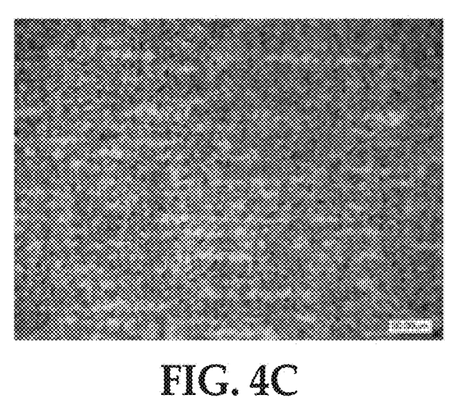
Figure 4D:
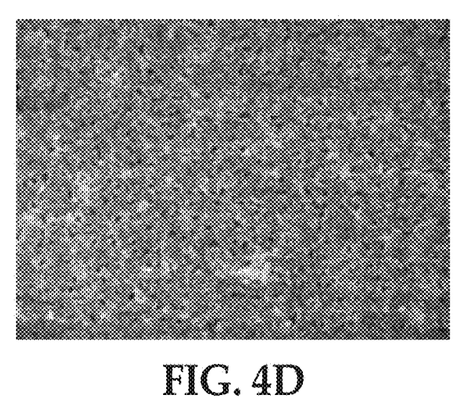

After the respective parts were formed, the parts were cut, and microscopy photographs of the cross-sections were taken. The reference part (formed with 4 passes of the reference fusing aid, and including 8.0 w/w % of $SiO_2$) is shown in FIG. 4A. Example part 1 (formed with 4 passes of SAFF 1, and including 6.2 w/w % of $Al_2O_3$) is shown in FIG. 4B. Example part 2 (formed with 2 passes of SAFF 2, and including 3.2 w/w % of AlO(OH)) is shown in FIG. 4C. Example part 3 (formed with 1 pass of SAFF 3, and including 1.7 w/w % of AlO(OH)) is shown in FIG. 4D.

The cross-section microscopy images illustrate that example parts 1-3, formed with the example sintering aid/fixer fluids (FIGS. 4B-4D) had improved layer definition (compared to the reference part shown in FIG. 4A) due to the cationically stabilized amphoteric alumina particulate material immobilizing the anionically stabilized susceptor material (in this example the carbon black particles and the iron oxide particles) in the areas of the build material fused to form the parts. Example parts 1-3 also had a more uniform distribution of particles than the reference part. Comparing FIGS. 4B through 4D, with an increased amount of the cationically stabilized amphoteric alumina particulate material, improved particle distribution and part definition is achieved.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50 nm to about 100 nm should be interpreted to include the explicitly recited limits of 50 nm to 100 nm, as well as individual values, such as 55 nm, 77.5 nm, etc., and sub-ranges, such as from about 60 nm to about 80 nm, etc. Furthermore, when "about" is utilized to describe a value, this is meant to encompass minor variations (up to +/ −10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
   applying a ceramic build material;
   applying a liquid functional material, including an anionically stabilized susceptor material, to a portion of the ceramic build material, wherein the anionically stabilized susceptor material is selected from the group consisting of a carbon black particle having negatively charged groups at a surface of the carbon black particle, a carbon black particle having a negatively charged polymeric dispersant absorbed to a surface thereof, a ferromagnetic metal oxide particle having an anionic dispersing species absorbed to a surface thereof, a semiconductor or conductive oxide particle having an anionic dispersing species absorbed to a surface thereof, and combinations thereof, and applying a sintering aid/fixer fluid, including a cationically stabilized amphoteric alumina particulate material, to the portion of the ceramic build material, the applied anionically stabilized susceptor material and the applied cationically stabilized amphoteric alumina particulate material reacting to immobilize and prevent the spreading of both materials outside the portion, thereby patterning the portion of the ceramic build material.

2. The 3D printing method as defined in claim 1 wherein the liquid functional material is applied before the sintering aid/fixer fluid.

3. The 3D printing method as defined in claim 1 wherein the liquid functional material and the sintering aid/fixer fluid are applied simultaneously from separate applicators.

4. The 3D printing method as defined in claim 1 wherein the application of the ceramic build material, the liquid functional material, and the sintering aid/fixer fluid forms a first layer of a green body, and wherein the method further comprises heating the green body using microwave radiation, radio frequency radiation, or thermal energy, thereby sintering the ceramic build material and the applied cationically stabilized amphoteric alumina particulate material of the green body to form a part.

5. The 3D printing method as defined in claim 1 wherein the application of the ceramic build material, the liquid functional material, and the sintering aid/fixer fluid forms a first layer of a green body, and wherein the method further comprises forming a second layer of the green body by:
applying additional ceramic build material to the first layer of the green body;
applying the liquid functional material to a portion of the additional ceramic build material; and
applying the sintering aid/fixer fluid to the portion of the additional ceramic build material.

6. The 3D printing method as defined in claim 5, further comprising forming subsequent layers of the green body by repeating the application of the ceramic build material, the liquid functional material, and the sintering aid/fixer fluid in each subsequent layer.

7. The 3D printing method as defined in claim 6, further comprising heating the green body using microwave radiation, radio frequency radiation, or thermal energy, thereby sintering the ceramic build material of the green body to form a part.

8. The 3D printing method as defined in claim 1 wherein:
the ceramic build material includes particles having a particle size ranging from about 100 nm and about 500 µm;
the cationically stabilized amphoteric alumina particulate material has a particle size of less than 100 nm; and
the applied cationically stabilized amphoteric alumina particulate material fills at least some voids between the ceramic build material.

9. The 3D printing method as defined in claim 1 wherein the sintering aid/fixer fluid has a pH ranging from about 3.5 to about 5.0.

10. The 3D printing method as defined in claim 9, further comprising forming the sintering aid/fixer fluid by milling a water-dispersible amphoteric alumina powder in an aqueous vehicle having the pH ranging from about 3.5 to about 5.0.

11. The 3D printing method as defined in claim 1 wherein:
the ferromagnetic metal oxide particle is selected from the group consisting of $Fe_3O_4$, a complex ferrite, and combinations thereof; and
the anionic dispersing species absorbed to the surface of the ferromagnetic metal oxide particle is selected from the group consisting of multi-carboxylic organic acids, phosphate ions, and water-soluble polymers containing carboxylic groups or sulfo groups.

12. A three-dimensional (3D) printing method, comprising:
forming a green body with multiple layers, each of the multiple layers being formed by:
applying ceramic build material; and
patterning the ceramic build material by:
applying a liquid functional material, including an anionically stabilized susceptor material selected from the group consisting of a carbon black particle having negatively charged groups at a surface of the carbon black particle, a carbon black particle having a negatively charged polymeric dispersant absorbed to a surface thereof, a ferromagnetic metal oxide particle having an anionic dispersing species absorbed to a surface thereof, a semiconductor or conductive oxide particle having an anionic dispersing species absorbed to a surface thereof, and combinations thereof, to a portion of the ceramic build material; and
applying a sintering aid/fixer fluid, including a cationically stabilized amphoteric alumina particulate material, to the portion of the ceramic build material,
the applied anionically stabilized susceptor material and the applied cationically stabilized amphoteric alumina particulate material reacting to immobilize and prevent the spreading of both materials outside the portion, and the applied cationically stabilized amphoteric alumina particulate material filling at least some voids between the ceramic build material; and
heating the green body using microwave radiation, radio frequency radiation, or thermal energy, thereby sintering the ceramic build material and the applied cationically stabilized amphoteric alumina particulate material of the green body to form a part.

13. A three-dimensional (3D) printing system, comprising:
a supply of ceramic build material;
a build material distributor;
a supply of a liquid functional material including an anionically stabilized susceptor material selected from the group consisting of a carbon black particle having negatively charged groups at a surface of the carbon black particle, a carbon black particle having a negatively charged polymeric dispersant absorbed to a surface thereof, a ferromagnetic metal oxide particle having an anionic dispersing species absorbed to a surface thereof, a semiconductor or conductive oxide particle having an anionic dispersing species absorbed to a surface thereof, and combinations thereof;
a supply of a sintering aid/fixer fluid including a cationically stabilized amphoteric alumina particulate material;

respective applicators for selectively dispensing the liquid functional material and the sintering aid/fixer fluid;

a controller; and a non-transitory computer readable medium having stored thereon computer executable instructions to cause the controller to:

utilize the build material distributor to dispense a layer of the ceramic build material; and utilize the applicators to simultaneously or sequentially dispense the liquid functional material and the sintering aid/fixer fluid onto a portion of the layer of the ceramic build material such that at least some of the anionically stabilized susceptor material reacts with at least some of the cationically stabilized amphoteric alumina particulate material to immobilize and prevent the spreading of both materials outside the portion.

14. The 3D printing system as defined in claim 13 wherein:

the sintering aid/fixer fluid has a pH ranging from about 3.5 to about 5.0.

* * * * *